(12) United States Patent
Li (10) Patent No.: US 8,666,385 B2
(45) Date of Patent: *Mar. 4, 2014

(54) DATA DOWNLOAD METHOD AND TERMINAL

(75) Inventor: Fei Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/259,751

(22) PCT Filed: Dec. 14, 2009

(86) PCT No.: PCT/CN2009/075559
§ 371 (c)(1),
(2), (4) Date: Feb. 24, 2012

(87) PCT Pub. No.: WO2010/145133
PCT Pub. Date: Dec. 23, 2010

(65) Prior Publication Data
US 2012/0142332 A1    Jun. 7, 2012

(30) Foreign Application Priority Data

Jun. 30, 2009    (CN) .......................... 2009 1 0158446

(51) Int. Cl.
*H04M 3/00*     (2006.01)
*H04M 3/42*     (2006.01)
*H04B 1/38*     (2006.01)
*H04L 12/28*    (2006.01)
*G06F 15/16*    (2006.01)

(52) U.S. Cl.
USPC ........ 455/419; 455/558; 455/414.1; 370/419; 709/219

(58) Field of Classification Search
USPC .......................................... 455/419; 370/419
See application file for complete search history.

(56) References Cited

U.S. PATENT DOCUMENTS

2005/0259673 A1* 11/2005 Lu et al. ........................ 370/419
2006/0079284 A1*  4/2006 Lu et al. ........................ 455/558

(Continued)

FOREIGN PATENT DOCUMENTS

CN          101068374 A      11/2007
CN          101150818 A       3/2008

(Continued)

OTHER PUBLICATIONS

International Search Report with English Translation issued in PCT/CN2009/075559 dated Apr. 15, 2010.

(Continued)

*Primary Examiner* — Timothy Pham
(74) *Attorney, Agent, or Firm* — Li & Cai Intellectual Property (USA) Office (57) ABSTRACT

The present invention provides a data downloading method and a terminal, wherein the data downloading method includes: a communication processor receiving an open channel request from a universal integrated circuit card, and sending a connection request message to an application processor according to the open channel request; the communication processor sending a connection success message to the universal integrated circuit card, so as to instruct the universal integrated circuit card to download data The present invention not only enables a process of downloading an application over the air to the UICC by using the BIP (bearer independent protocol) protocol to be completed in a single processor, but also supports the process to be completed in multiple processors.

10 Claims, 7 Drawing Sheets

(56) References Cited

U.S. PATENT DOCUMENTS

| | | |
|---|---|---|
| 2006/0205435 A1* | 9/2006 | Lee et al. ........................ 455/558 |
| 2007/0239857 A1* | 10/2007 | Mahalal et al. ................ 709/219 |
| 2008/0121687 A1 | 5/2008 | Buhot |
| 2009/0011745 A1* | 1/2009 | Cha ............................ 455/414.1 |
| 2009/0191917 A1* | 7/2009 | Zappulla et al. .............. 455/558 |

FOREIGN PATENT DOCUMENTS

| | | |
|---|---|---|
| CN | 101222514 A | 7/2008 |
| CN | 101273553 A | 9/2008 |
| CN | 101335758 A | 12/2008 |
| CN | 101594614 A | 12/2009 |
| JP | P2006-501583 A | 1/2006 |
| JP | P2009-514470 A | 4/2009 |

OTHER PUBLICATIONS

Japan Patent Office, Office Action issued on Jul. 23, 2013.

* cited by examiner

DATA DOWNLOAD METHOD AND TERMINAL

FIELD OF THE INVENTION

The present invention relates to communication field, and in particular to a data downloading method and a terminal.

BACKGROUND OF THE INVENTION

According to the requirements of Global Systems for Mobile Communications Association ("GSMA" for short) to supporting enhanced Near Field Communication ("eNFC" for short) mobile phone, the mobile phone should implement over-the-air ("OTA" for short) download function of bearer independent protocol ("BIP" for short) protocol.

The architecture of a smart cell generally comprises an application processor ("AP" for short) and one or more communication processors ("CP" for short), wherein the AP is configured for processing application programs of the mobile phone, such as browser, transmission control protocol/Internet protocol ("TCP/IP" for short) protocol stack, wireless fidelity ("WiFi" for short), blue tooth; and the one or more CPs are responsible for affairs associated with communication network air interfaces, including radio frequency signal processing, communication protocol stack and universal integrated circuit card ("UICC" for short) interface etc. In this mode, the browser, the java programs and other application programs, and the UICC interfaces reside in different processors, and to implement functions thereof, it is necessary to go through a path between two processors, which situation is more complex than a terminal with a single processor.

Currently, downloading applications to the UICC over the air (OTA) is carried out on a single professor. However, currently when the downloading is via OTA, the data exchange between AP and CPs cannot be performed normally on a multi-processor mobile terminal.

SUMMARY OF THE INVENTION

The present invention is made upon considering the problem that the AP and the CP cannot exchange data normally on a multi-processor mobile terminal in the current OTA download. Therefore, the present invention is proposed to provide a data downloading solution to solve the problem.

According to one aspect of the present invention, a data downloading method is provided.

The data downloading method according to the present invention comprises: a communication processor receiving an open channel request from a universal integrated circuit card, and sending a connection request message to an application processor according to the open channel request, wherein the connection request message is used to instruct the application processor to read network connection parameters; the communication processor receiving a connection response message from the application processor, wherein the connection response message carries the network connection parameters; and the communication processor sending a transmission control protocol connection request to a far-end over-the-air server according to the network connection parameters, and sending a connection success message to the universal integrated circuit card according to a transmission control protocol connection acknowledgement message received from the far-end over-the-air server so as to instruct the universal integrated circuit card and the far-end over-the-air server to download a data through a connection established.

Preferably, after the communication processor sends the connection success message to the universal integrated circuit card, the method further comprises: receiving a data setup request message of a bearer independent protocol from the universal integrated circuit card by the communication processor; converting the data setup request message of the bearer independent protocol to a data setup request message of a transmission control protocol/Internet protocol by the communication processor; and sending the data setup request message of the transmission control protocol/Internet protocol to the far-end over-the-air server by the communication processor, wherein the data setup request message of the transmission control protocol/Internet protocol is used to request to download a data.

Preferably, after the communication processor sends the data setup request message of the transmission control protocol/Internet protocol to the far-end over-the-air server, the method further comprises: receiving an establishing data response message of the transmission control protocol/Internet protocol from the far-end over-the-air server by the communication processor, wherein the establishing data response message of the transmission control protocol/Internet protocol carries data downloads; sending a channel data available message to the universal integrated circuit card by the communication processor, wherein the channel data available message is used to inform the universal integrated circuit card that the data downloads have been received; and the communication processor receiving a receiving data response message from the universal integrated circuit card and sending the data downloads to the universal integrated circuit card.

Preferably, after the communication processor sends the data downloads to the universal integrated circuit card, the method further comprises: the communication processor receiving a channel close request message from the universal integrated circuit card, and closing the connection; and the communication processor sending a channel close acknowledgement message to the universal integrated circuit card, and sending a transmission control protocol close connection request to the far-end over-the-air server so that the far-end over-the-air server closes the connection.

A data downloading method is further provided according to one aspect of the present invention.

The data downloading method according to the present invention includes: a communication processor receiving an open channel request from a universal integrated circuit card, and sending a connection request message to an application processor according to the open channel request, wherein the connection request message is used to instruct the application processor to establish a connection; the communication processor receiving a connection success response message from the application processor, wherein the connection success response message is used to indicate that the application processor and the far-end over-the-air server have established a connection; and the communication processor sending a connection success message to the universal integrated circuit card so as to indicate the universal integrated circuit card to download data through the connection.

Preferably, after the communication processor sends the connection request message to the application processor, the method further comprises: the application processor receiving a connection request message from the communication processor; the application processor sending a transmission control protocol connection request to the far-end over-the-air server, wherein the transmission control protocol connection request is used to request to establish the connection; and the application processor receiving a transmission control protocol connection acknowledgement message from the far-end over-the-air server.

Preferably, after the communication processor sends the connection success message to the universal integrated circuit card, the method further comprises: the communication processor receiving a data setup request message of a bearer independent protocol from the universal integrated circuit card, and sending the data setup request message of the bearer independent protocol to the application processor through a multiplexer channel; and the communication processor receiving the establishing data response message sent from the application processor through the multiplexer channel, wherein the establishing data response message carries data downloads.

Preferably, after the communication processor sends the data setup request message of the bearer independent protocol to the application processor through the multiplexer channel, the method further includes: the application processor receiving the data setup request message of the bearer independent protocol from the communication processor; the application processor converting the data setup request message of the bearer independent protocol to a data setup request message of a transmission control protocol/Internet protocol; and the application processor sending the data setup request message of the transmission control protocol/Internet protocol to the far-end over-the-air server, wherein the data setup request message of the transmission control protocol/Internet protocol is used to request to download data.

Preferably, after the communication processor receives the establishing data response message sent from the application processor through the multiplex channel, the method further comprises: the communication processor sending a channel data available message to the universal integrated circuit card, wherein the channel data available message is used to inform the universal integrated circuit card that the data downloads have been received; and the communication processor receiving a receiving data response message from the universal integrated circuit card, and sending the data downloads to the universal integrated circuit card.

Preferably, after the communication processor sends the data downloads to the universal integrated circuit card, the method further comprises: the communication processor receiving a channel close request message from the universal integrated circuit card, and closing the connection; and the communication processor sending a channel close acknowledgement message to the universal integrated circuit card, and sending a transmission control protocol close connection request to the application processor so that the application processor and the far-end over-the-air server close the connection.

A terminal is provided according to another aspect of the present invention.

The terminal according to the present invention comprises a communication processor and an application processor, wherein the communication processor comprises: a first receiving module, configured to receive an open channel request from a universal integrated circuit card; a first sending module, configured to send a connection request message to the application processor according to the open channel request received by the first receiving module, wherein the connection request message is used to instruct the application processor to read network connection parameters; a second receiving module, configured to receive a connection response message from the application processor, wherein the connection response message carries the network connection parameters; a second sending module, configured to send a transmission control protocol connection request to a far-end over-the-air server according to the network connection parameters received by the second receiving module; a third receiving module, configured to receive a transmission control protocol connection acknowledgement message from the far-end over-the-air server; and a third sending module, configured to send a connection success message to the universal integrated circuit card so as to instruct the universal integrated circuit card and the far-end over-the-air server to download data through a connection established.

A terminal is provided according to another aspect of the present invention.

The terminal according to the present invention comprises a communication processor and an application processor, wherein the communication processor comprises: a fourth receiving module, configured to receive an open channel request from a universal integrated circuit card; a fourth sending module, configured to send a connection request message to the application processor according to the open channel request received by the fourth receiving module, wherein the connection request message is used to indicate the application processor to establish a connection; a fifth receiving module, configured to receive a connection success response message from the application processor, wherein the connection success response message is used to indicate that the application processor and the far-end over-the-air server have established the connection; and a fifth sending module, configured to send a connection success message to the universal integrated circuit card so as to instruct the universal integrated circuit card to download data through the connection.

With the present invention, the CP sends the connection request message to the AP according to the open channel request, sends the TCP connection request to the far-end OTA server according to the network connection parameters in the connection response message received from the AP, and sends the connection success message to the UICC according to the TCP connection acknowledgement message received from the far-end OTA server so as to indicate the UICC and the far-end OTA server to download the data through the connection established, which solves the problem that the AP and the CP cannot exchange data normally on a multi-processor mobile terminal in the current OTA download, and not only enables the process of downloading an application over the air (OTA) to the UICC using the BIP protocol to be completed in a single processor, but also supports the process to be completed in multiple processors.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention, wherein.

DETAILED DESCRIPTION OF EMBODIMENTS

It should be indicated that the embodiments and features therein of the present application can be combined with each other if no conflict is caused. Next, the embodiments of the present invention will be illustrated in detail with reference to the figures.

Figure 1:
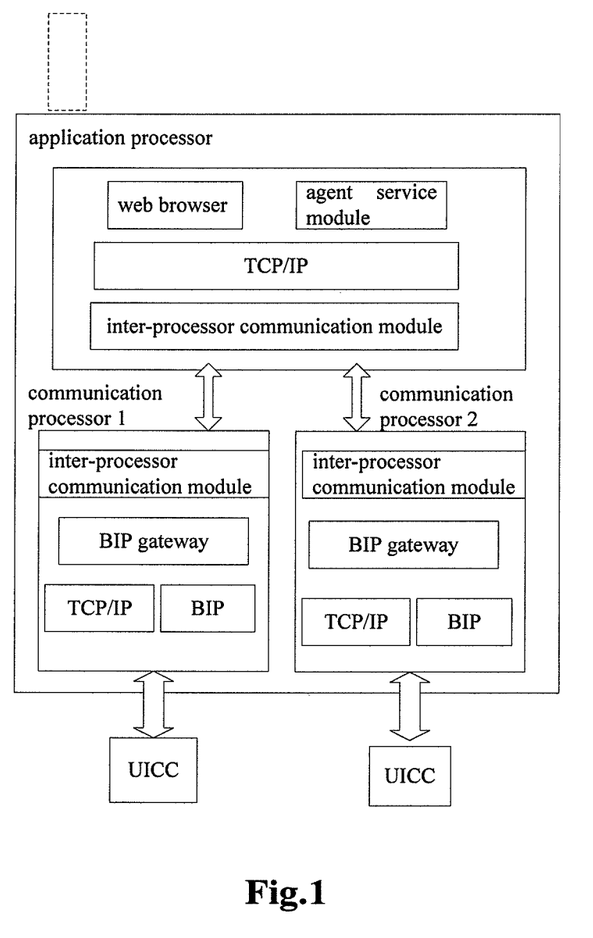
FIG. 1 is a block diagram of a system structure of a terminal for implementing an embodiment of the present invention.

FIG. 1 is a block diagram of a system structure of a terminal for implementing an embodiment of the present invention. As shown in FIG. 1, the terminal comprises an application processor, one or more communication processors, UICC(s) and inter-processor channel(s), wherein the application processor comprises: a web browser, a TCP/IP protocol stack, an agent service module and an inter-processor communication module (that may be an AT command module and/or a multiplexer ("MUX" for short) module), and each communication processor comprises a TCP/IP protocol stack (optional), a BIP gateway and a BIP protocol module and an inter-processor communication module (that may be an AT command module and/or an MUX module).

Next, two solutions provided in the embodiments of the present invention will be described in detail. The two solutions describe two different methods used for downloading an application over the air (OTA) to the UICC by using a BIP protocol in multiple processors, wherein commands and data are exchanged between an AP and CP(s) by a method of using a TCP/IP protocol stack in a communication processing module in FIG. 2 to FIG. 4; and the commands and data are exchanged between the AP and the CP(s) by a method of using a TCP/IP protocol stack in a processing module of an application processor and using WiFi as an access manner in FIG. 5 to FIG. 7.

It should be indicated that in specific implementations, the inter-processor physical channels may be of various types. The following embodiments take a serial port as an example, but the implementation of the present invention is not limited to the serial port.

Method Embodiment 1

Figure 2:
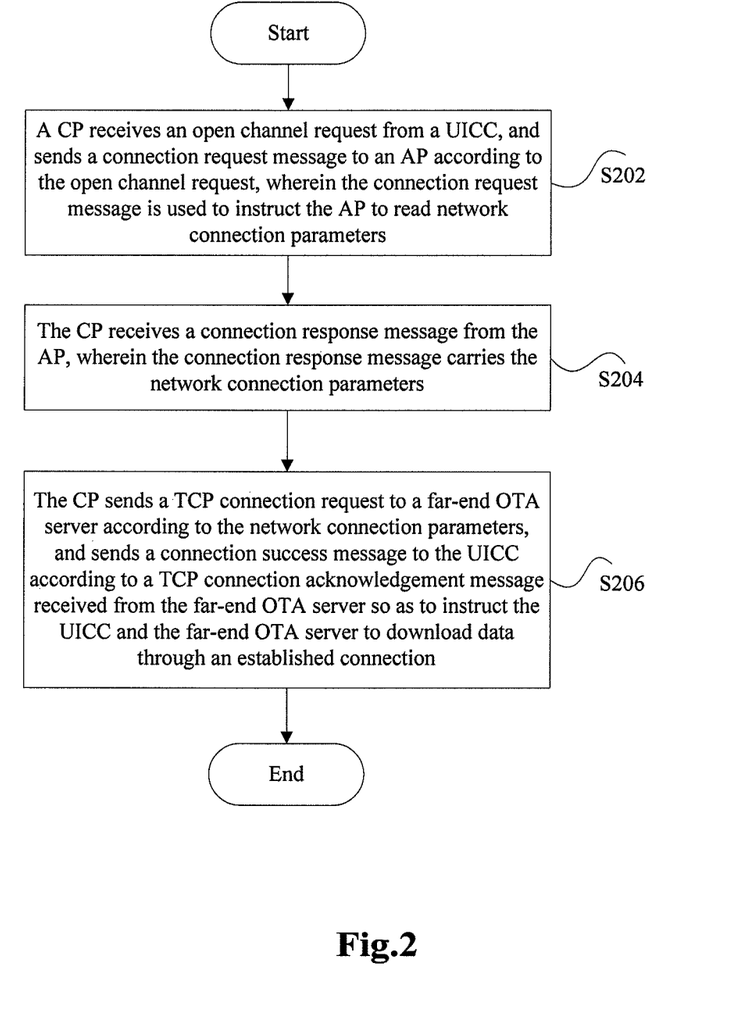
FIG. 2 is a flow chart of a data downloading method according to Embodiment 1 of the present invention.

A data downloading method, i.e., a method of downloading an application via over the air (OTA) to a UICC by using a BIP protocol in multiple processors, is provided according to an embodiment of the present invention. FIG. 2 is a flow chart of a data downloading method according to Embodiment 1 of the present invention. As shown in FIG. 2, the method comprises step S202 to step S206.

Step S202, a CP receives an open channel request from the UICC, and sends a connection request message to an AP according to the open channel request, wherein the connection request message is used to instruct the AP to read network connection parameters.

Step S204, the CP receives a connection response message from the AP, wherein the connection response message carries the network connection parameters.

Step S206, the CP sends a TCP connection request to a far-end OTA server according to the network connection parameters, and sends a connection success message to the UICC according to a TCP connection acknowledgement message received from the far-end OTA server so as to instruct the UICC and the far-end OTA server to download data through an established connection.

With this embodiment, a process of downloading the application over the air (OTA) to the UICC by using the BIP protocol not only can be completed in a single processor, but is also supported to be completed in multiple processors.

Next, a first method of exchanging commands and data between the AP and the CP will be described in conjunction with FIG. 3 and FIG. 4.

Figure 3:
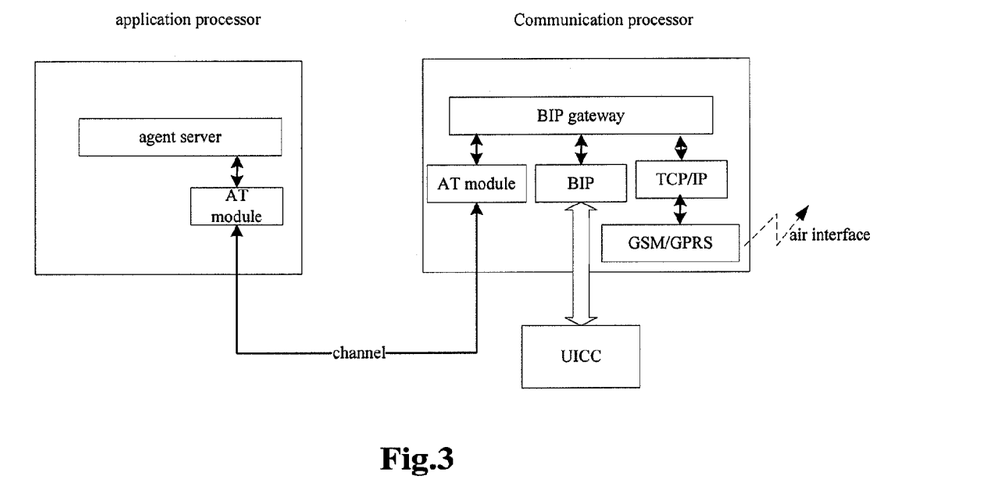
FIG. 3 is a block diagram of a system structure of a dual-processor terminal of OTA download by using the BIP protocol by the terminal according to Embodiment 1 of the present invention.

FIG. 3 is a block diagram of a system structure of a dual-processor terminal of OTA download by using the BIP protocol by the terminal according to Embodiment 1 of the present invention. As shown in FIG. 3, the application processor comprises an agent server and an AT module. An AT module, a TCP/IP protocol stack, a BIP gateway and a BIP protocol module are included at the communication processor side.

Figure 4:
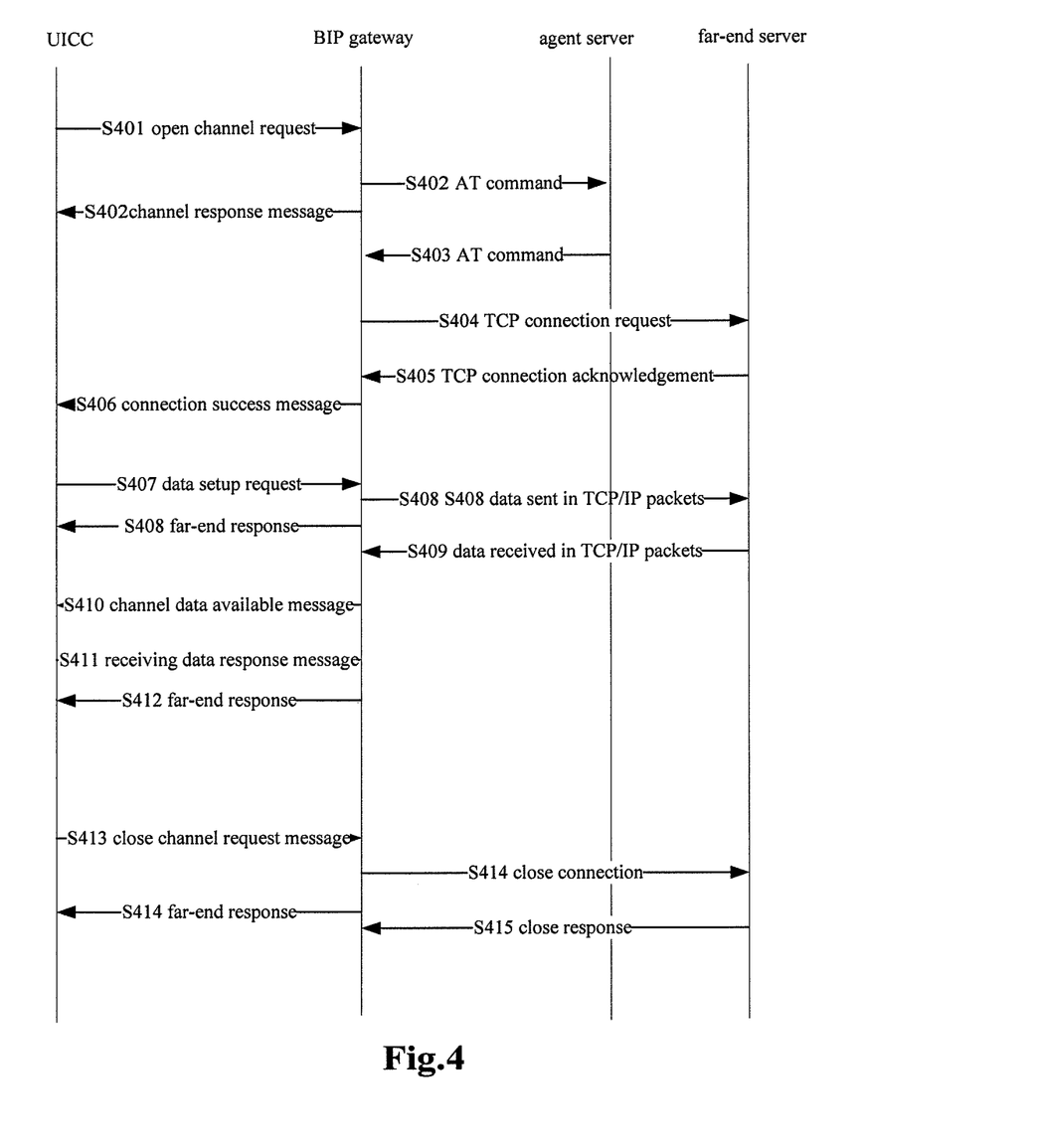
FIG. 4 is a flow chart of a process of the OTA download by using the BIP protocol in the dual-processor terminal according to Embodiment 1 of the present invention.

FIG. 4 is a flow chart of a process of the OTA download by using the BIP protocol in the dual-processor terminal according to Embodiment 1 of the present invention. As shown in FIG. 4, the method of the multi-processor terminal downloading the application over the air (OTA) to the UICC by using the BIP protocol mainly comprises the following four steps, specifically comprising Step S401 to Step S415 as follows.

Step 1, the UICC is connected with a far-end OTA server, specifically including the following steps.

Step S401, the UICC sends an open channel request (Fetch: open channel (client)) to the BIP gateway in a BIP protocol manner.

Step S402, the BIP gateway sends an AT command (% GETNET) for reading network connection parameters to the agent server on the AP according to the requirements of the network bearer mode contained in the open channel request, and returns an open channel response message (Terminal Response) (channel id) to the UICC (i.e., above step S202).

Step S403, the agent server on the AP reads corresponding network connection parameters (such as GPRS access point, subscriber and password), and returns the AT command (% GETNET) carrying the network connection parameters to the BIP gateway on the CP (i.e., above step S204).

Step S404, the BIP gateway sends a TCP connection request to the far-end OTA server designated in the open channel request through the TCP/IP protocol stack.

Step S405, the far-end OTA server, after receiving the TCP connection request, returns a TCP connection acknowledgement to the BIP gateway.

Step S406, the BIP gateway sends a connection success message (Event Channel Status) (Link Established) to the UICC (i.e., above step S206).

Step 2, the UICC sends request data to the far-end OTA server, specifically including the following steps.

Step S407, the UICC sends a request to the BIP gateway through the BIP protocol, i.e., a data setup request is sent (Fetch: send data). Thereafter, the CP receives a data setup request message of the BIP protocol from the UICC.

Step S408, the BIP gateway converts the requested data, transmits it through the TCP/IP protocol to the far-end OTA server, i.e., the BIP gateway sending the data sent in TCP/IP packets to the far-end OTA server, and sends a far-end response (Terminal Response) to the UICC. That is to say, the CP converts the data setup request message of the BIP protocol to a data setup request message of the TCP/IP protocol;

and the CP sends the data setup request message of the TCP/IP protocol to the far-end OTA server, wherein the data setup request message of the TCP/IP protocol is used to request to download data.

Step 3, the far-end OTA server sends response data to the UICC, specifically including the following steps.

Step S409, the far-end OTA server sends the response data transmitted through the TCP/IP protocol to the BIP gateway, i.e., the far-end OTA server sends the data received in TCP/IP packets to the BIP gateway.

Step S410, the BIP gateway, after receiving the response data, sends a channel data available message, Envelope (channel data available), to inform the UICC of arrival of data.

Specifically, the CP receives an data setup response message of the TCP/IP protocol from the far-end OTA server, wherein the data setup response message of the TCP/IP protocol carries data downloads; and the CP sends the channel data available message to the UICC, and wherein the channel data available message is used to inform the UICC that the data downloads have been received.

Step S411, the UICC returns a receiving data response message (Fetch: receive data) to request to receive access data. Thereafter, the CP receives the receiving data response message from the UICC.

Step S412, the BIP gateway sends response data (i.e., the data downloads) to the UICC through a far-end response (Terminal response) (data).

Step 4, close the connection: the CP receives a close channel request message from the UICC and closes the connection; and the CP sends a channel close acknowledgement message to the UICC and sends a TCP close connection request to the far-end OTA server so that the far-end OTA server closes the connection. The process specifically includes the following steps.

Step S413, the UICC sends a close channel request message (Fetch: close channel) (channel id) to the BIP gateway to request to close the channel.

Step S414, the BIP gateway, after closing the connection, confirms to close the channel by sending the far-end response (Terminal response) (channel status: link not established) to the UICC, and at the same time, sends a TCP close connection request to the far-end server OTA.

Step S415, the far-end OTA server returns a close response to the BIP gateway and the connection has been closed.

Method Embodiment 2

Figure 5:
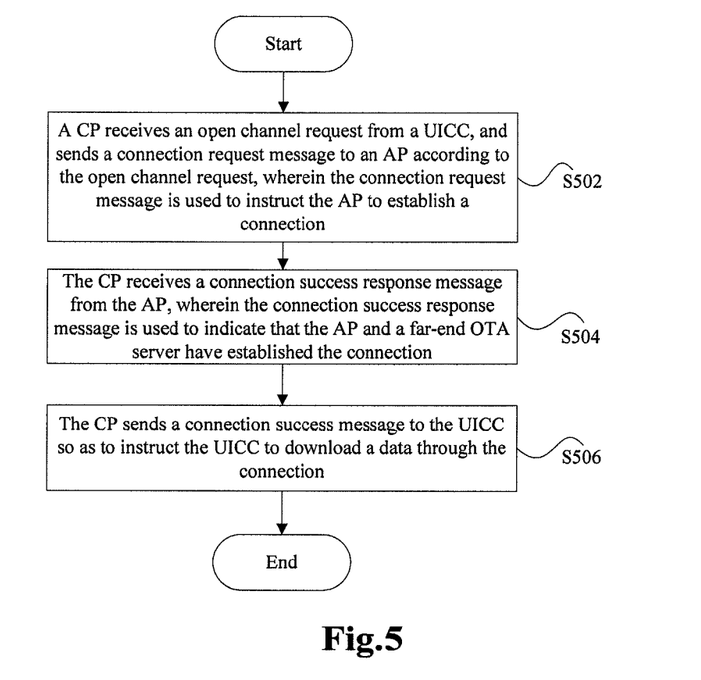
FIG. 5 is a flow chart of a data downloading method according to Embodiment 2 of the present invention.

A data downloading method is provided according to an embodiment of the present invention. FIG. 5 is a flow chart of a data downloading method according to Embodiment 2 of the present invention. As shown in FIG. 5, the method comprises Step S502 to Step 506.

Step S502, a CP receives an open channel request from a UICC, and sends a connection request message to an AP according to the open channel request, wherein the connection request message is used to instruct the AP to establish a connection.

Step S504, the CP receives a connection success response message from the AP, wherein the connection success response message is used to indicate that the AP and a far-end OTA server have established the connection.

Step S506, the CP sends a connection success message to the UICC so as to instruct the UICC to download data through the connection.

Next, a second method of exchanging commands and data between the AP and the CP will be described in conjunction with FIG. 6 and FIG. 7.

Figure 6:
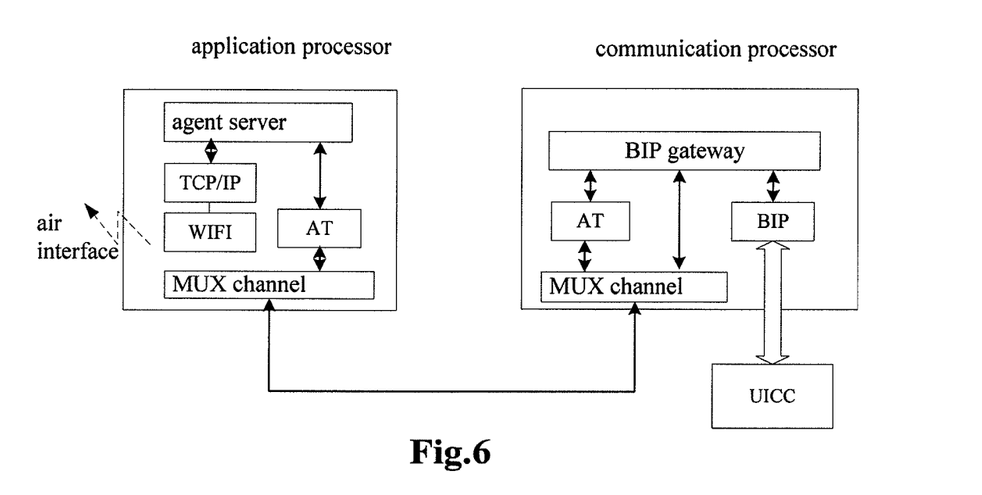
FIG. 6 is a block diagram of a system structure of a dual-processor terminal of OTA download by using the BIP protocol by the terminal according to Embodiment 2 of the present invention.

FIG. 6 is a block diagram of a system structure of a dual-processor terminal of OTA download by using the BIP protocol by the terminal according to Embodiment 2 of the present invention. As shown in FIG. 6, the application processor comprises a TCP/IP protocol stack, a WiFi module, an agent server, an AT module, and an MUX channel. An AT module, an MUX channel, a TCP/IP protocol stack, a BIP gateway and a BIP protocol module are included at the communication processor side.

Figure 7:
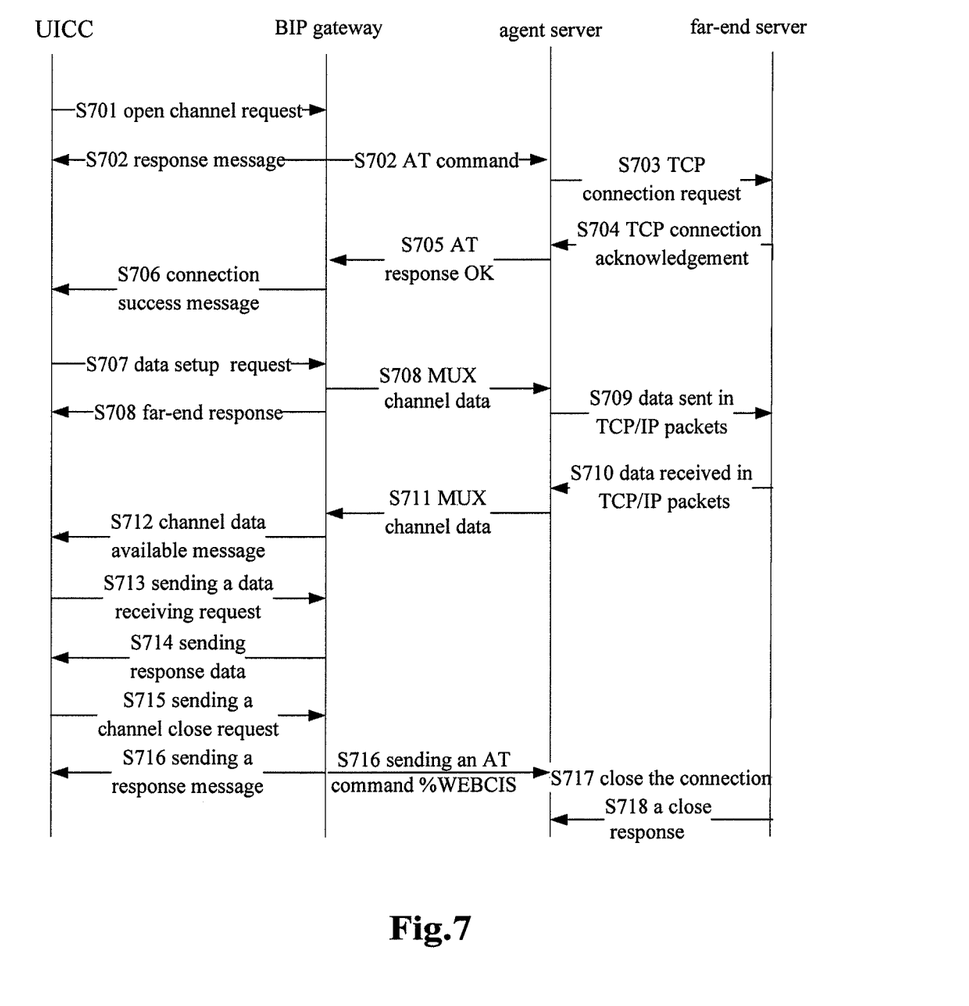
FIG. 7 is a flow chart of a process of OTA download by using the BIP protocol in the dual-processor terminal according to Embodiment 2 of the present invention.

FIG. 7 is a flow chart of a process of the OTA download by using the BIP protocol in the dual-processor terminal according to Embodiment 2 of the present invention. As shown in FIG. 7, the method of the multi-processor terminal downloading the application over the air (OTA) to the UICC by using the BIP protocol mainly includes the following four steps, specifically including Step S701 to Step S718 as follow.

Step 1, the UICC establishes a connection with a far-end OTA server.

Step S701, the UICC sends an open channel request (Fetch: open channel (client)) to the BIP gateway in a BIP protocol manner;

Step S702, the BIP gateway sends a response message (Terminal response (channel id)) to the UICC, and at the same time, sends an AT command (% WEBOPCH) used for establishing a network connection to the agent server on the AP (i.e., above step S502).

Step S703, at this time, the AP has accessed the network through WiFi, the AP receives a connection request message from the CP, and the agent server on the AP reads a TCP connection request sent to a far-end OTA server designated in the open channel request through the TCP/IP protocol stack, wherein the TCP connection request is used to request establishing a connection.

Step S704, the far-end server OTA returns a TCP connection acknowledgement message to the agent server, and the AP receives the TCP connection acknowledgement message from the far-end OTA server.

Step S705, the agent server returns a successful connection establishment AT response (OK) to the BIP gateway (i.e., step S504 above).

Step S706, the BIP gateway sends a successful connection message (Event channel status (link established)) to the UICC (i.e., step S506 above).

Step 2, the UICC sends request data to the OTA server, specifically including the following steps.

Step S707, the UICC sends a data setup request (Fetch: send data) to the BIP gateway through the BIP protocol.

Step S708, the CP receives a data setup request message of the BIP protocol from the UICC, the BIP gateway sends the data setup request message of the BIP protocol to the agent server through the MUX channel, and returns a far-end response to the UICC.

Step S709, the AP receives the data setup request message of the BIP protocol from the CP; the AP converts the data setup request message of the BIP protocol to a data setup request message of the TCP/IP protocol; and the AP sends the data setup request message of the TCP/IP protocol to the far-end OTA server, wherein the data setup request message of the TCP/IP protocol is used to request to download data, i.e., the agent server converts the request data to be transmitted through the TCP/IP protocol and sent to the far-end OTA server, viz., the BIP gateway sends the data sent in TCP/IP packets to the far-end OTA server.

Step 3, the far-end OTA server sends response data to the UICC, specifically including the following steps.

Step S710, the far-end OTA server sends the response data transmitted through the TCP/IP protocol to the agent server, i.e., the far-end OTA server sends the data received in TCP/IP packets to the BIP gateway.

Step S711, the agent server sends the data to the BIP gateway through the MUX channel. The CP receives the data setup response message sent from the AP through the MUX channel, wherein the data setup response message carries data downloads.

Step S712, the BIP gateway, after receiving the response data, sends a channel data available message, Envelope (channel data available), to inform the UICC of arrival of data, i.e., the CP sends the channel data available message to the UICC, wherein the channel data available message is used to inform the UICC that the data downloads have been received.

Step S713, the UICC returns a data receiving request (Fetch: receive data) to request to receive access data, i.e., the CP receives a receiving data response message from the UICC.

Step S714, the BIP gateway sends response data (i.e., the data downloads) to the UICC through the response message (Terminal response (data)).

Step 4, close the connection: the CP receives a channel close request message from the UICC and closes the connection; and the CP sends a channel close acknowledgement message to the UICC and sends a TCP close connection request to the AP so that the AP and the far-end OTA server close the connection. The process specifically includes the following steps.

Step S715, the UICC sends a channel close request (Fetch: close channel (channel id)) to the BIP gateway to request to close the channel.

Step S716, the BIP gateway, after closing the connection, confirms to close the channel by sending the response message (Terminal response) (channel status: link not established) to the UICC, and at the same time, sends an AT command (% WEBCIS) for closing the network connection to the agent server.

Step S717, the agent server sends a TCP close connection request to the far-end OTA server.

Step S718, the far-end OTA server returns a close response to the agent server, and the connection has been closed.

Apparatus Embodiment 1

Figure 8:
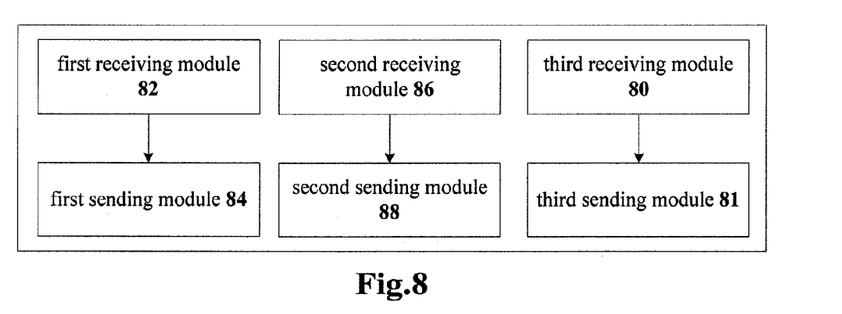
FIG. 8 is a structure block diagram of the terminal according to Embodiment 1 of the present invention.

A terminal is provided according to an embodiment of the present invention. FIG. 8 is a structure block diagram of a terminal according to Embodiment 1 of the present invention. As shown in FIG. 8, the terminal comprises a CP and an AP, wherein the CP comprises a first receiving module 82, a first sending module 84, a second receiving module 86, a second sending module 88, a third receiving module 80 and a third sending module 81. The structure above will be described below.

The first receiving module 82 is configured to receive an open channel request from a UICC; the first sending module 84, connected to the first receiving module 82, is configured to send a connection request message to the AP according to the open channel request received by the first receiving module 82, wherein the connection request message is used to instruct the AP to read network connection parameters; the second receiving module 86 is configured to receive a connection response message from the AP, wherein the connection response message carries the network connection parameters; the second sending module 88, connected to the second receiving module 86, is configured to send a TCP connection request to the far-end OTA server according to the network connection parameters received by the second receiving module 86; the third receiving module 80 is configured to receive a TCP connection acknowledgement message from the far-end OTA server; and the third sending module 81 is configured to send a connection success message to the UICC so as to indicate the UICC and the far-end OTA server to download data through the established connection.

Apparatus Embodiment 2

Figure 9:
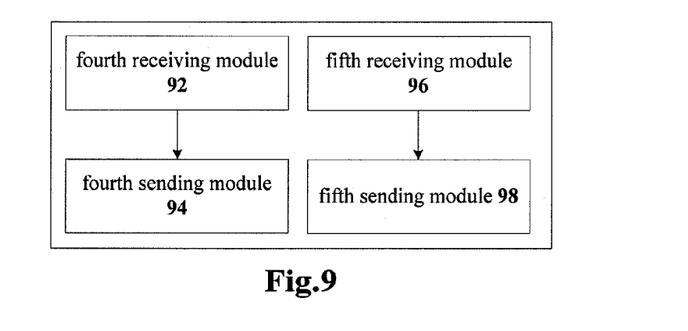
FIG. 9 is a structure block diagram of the terminal according to Embodiment 2 of the present invention.

A terminal is provided according to an embodiment of the present invention. FIG. 9 is a structure block diagram of a terminal according to Embodiment 2 of the present invention. As shown in FIG. 9, the terminal comprises a CP and an AP, wherein the CP comprises a fourth receiving module 92, a fourth sending module 94, a fifth receiving module 96 and a fifth sending module 98. The structure above will be described below.

The fourth receiving module 92 is configured to receive an open channel request from a UICC; the fourth sending module 94, connected to the fourth receiving module 92, is configured to send a connection request message to the AP according to the open channel request received by the fourth receiving module 92, wherein the connection request message is configured to instruct the AP to establish a connection; the fifth receiving module 96 is configured to receive a connection success response message from the AP, wherein the connection success response message is used to indicate that the AP and the far-end OTA server have established the connection; and the fifth sending module 98 is configured to send a connection success message to the UICC so as to indicate the UICC to download data through the connection.

To sum up, a novel method of exchanging commands and data between the AP and the CP is provided with the embodiments of the present invention, which enables the data to be exchanged normally between the AP and the CP on a multi-processor mobile terminal, and not only enables the process of downloading the applications over the air (OTA) to the UICC by using the BIP protocol to be completed in a single processor, but also supports the process to be completed in multiple processors.

Apparently, the person skilled in the art should know that each module or each step of the present invention can be realized by the general calculating apparatus; they can be collected in a single calculating apparatus or distributed on a network formed by a plurality of calculating apparatus. Optionally, they can be realized by the program codes executable by the calculating apparatus, accordingly, they can be stored in the storing apparatus to be executed by the calculating apparatus, or they can be fabricated into integrated circuit modules, respectively, or a plurality of modules or steps therein are fabricated into individual integrated circuit module for the accomplishment. Thus, the present invention is not limited to the combination of any particular hardware and software.

The above mentioned is merely the preferred embodiments of the present invention but not to limit the present invention. Various alterations and changes to the present invention are apparent to the person skilled in the art. Any modifications, equivalent substitutions, improvements etc. within the spirit and principle of the present invention should be concluded in the scope protected by the present invention.

What is claimed is:

1. A data downloading method, comprising:
   in a multi-processor terminal having an application processor and at least one communication processor,
      receiving by the communication processor an open channel request from a universal integrated circuit card, and
      sending a connection request message to the application processor according to the open channel request;
      the communication processor sending a connection success message to the universal integrated circuit card, so as to instruct the universal integrated circuit card to download data;
      wherein in the condition that the connection request message is used to instruct the application processor to read network connection parameters, the connection response message carries the network connection parameters, the step of the communication processor sending a connection success message to the universal integrated circuit card, so as to instruct the universal integrated circuit card to download data comprises: the communication processor sending a transmission control protocol connection request to a far-end over-the-air server according to the network connection parameters, and sending a connection success message to the universal integrated circuit card according to a transmission control protocol connection acknowledgement message received from the far-end over-the-air server, so as to instruct the universal integrated circuit card and the far-end over-the-air server to download data through an established connection;
      wherein after the communication processor sends the connection success message to the universal integrated circuit card, the method further comprises: receiving a data setup request message of the bearer independent protocol from the universal integrated circuit card by the communication processor; converting the data setup request message of the bearer independent protocol to a data setup request message of a transmission control protocol/Internet protocol by the communication processor; and sending the data setup request message of the transmission control protocol/Internet protocol to the far-end over-the-air server by the communication processor, wherein the data setup request message of the transmission control protocol/Internet protocol is used to request to download data;
   wherein after the communication processor sends the data setup request message of the transmission control protocol/Internet protocol to the far-end over-the-air server, the method further comprises: receiving an establishing data response message of the transmission control protocol/Internet protocol from the far-end over-the-air server by the communication processor, wherein the establishing data response message of the transmission control protocol/Internet protocol carries data downloads; sending a channel data available message to the universal integrated circuit card by the communication processor, wherein the channel data available message is used to inform the universal integrated circuit card that the data downloads have been received; and the communication processor receiving a receiving data response message from the universal integrated circuit card and sending the data downloads to the universal integrated circuit card.

2. The method according to claim 1, wherein after the communication processor sends the data downloads to the universal integrated circuit card, the method further comprises:
   the communication processor receiving a channel close request message from the universal integrated circuit card, and closing the connection; and
   the communication processor sending a channel close acknowledgement message to the universal integrated circuit card, and sending a transmission control protocol close connection request to the far-end over-the-air server so that the far-end over-the-air server closes the connection.

3. The method according to claim 1, wherein in the condition that the connection request message is used to instruct the application processor to establish a connection, the connection response message is a connection success response message, and the connection success response message is used to indicate that the application processor and the far-end over-the-air server have established a connection, the step of the communication processor sending a connection success message to the universal integrated circuit card, so as to instruct the universal integrated circuit card to download data comprises:
   the communication processor sending a connection success message to the universal integrated circuit card so as to indicate the universal integrated circuit card to download data through the connection.

4. The method according to claim 3, wherein after the communication processor sends the connection request message to the application processor, the method further comprises:
   the application processor receiving a connection request message from the communication processor;
   the application processor sending a transmission control protocol connection request to the far-end over-the-air server, wherein the transmission control protocol connection request is used to request to establish the connection; and
   the application processor receiving a transmission control protocol connection acknowledgement message from the far-end over-the-air server.

5. The method according to the claim 3, wherein after the communication processor sends the connection success message to the universal integrated circuit card, the method further comprises:
   the communication processor receiving a data setup request message of a bearer independent protocol from the universal integrated circuit, and sending the data setup request message of the bearer independent protocol to the application processor through a multiplexer channel; and
   the communication processor receiving the establishing data response message sent from the application processor through the multiplexer channel, wherein the establishing data response message carries data downloads.

6. The method according to claim 5, wherein after the communication processor sends the data setup request message of the bearer independent protocol to the application processor through the multiplexer channel, the method further comprises:
   the application processor receiving the data setup request message of the bearer independent protocol from the communication processor;

the application processor converting the data setup request message of the bearer independent protocol to a data setup request message of a transmission control protocol/Internet protocol; and the application processor sending the data setup request message of the transmission control protocol/Internet protocol to the far-end over-the-air server, wherein the data setup request message of the transmission control protocol/Internet protocol is used to request to download data.

7. The method according to claim 5, wherein after the communication processor receives the establishing data response message sent from the application processor through the multiplex channel, the method further comprises:

the communication processor sending a channel data available message to the universal integrated circuit card, wherein the channel data available message is used to inform the universal integrated circuit card that the data downloads have been received; and the communication processor receiving a receiving data response message from the universal integrated circuit card, and sending the data downloads to the universal integrated circuit card.

8. The method according to claim 7, wherein after the communication processor sends the data downloads to the universal integrated circuit card, the method further comprises:

the communication processor receiving a channel close request message from the universal integrated circuit card, and closing the connection; and the communication processor sending a channel close acknowledgement message to the universal integrated circuit card, and sending a transmission control protocol close connection request to the application processor so that the application processor and the far-end over-the-air server close the connection.

9. A multi-processor terminal comprising at least one communication processor and an application processor, wherein, the at least one communication processor is configured to receive an open channel request from a universal integrated circuit card; is configured to send a connection request message to the application processor according to the open channel request; and is configured to send a connection success message to the universal integrated circuit card, so as to instruct the universal integrated circuit card to download data;

wherein in the condition that the connection request message is used to instruct the application processor to read network connection parameters, the connection response message carries the network connection parameters, that the communication processor is configured to send a connection success message to the universal integrated circuit card, so as to instruct the universal integrated circuit card to download data comprises: the communication processor is configured to send a transmission control protocol connection request to a far-end over-the-air server according to the network connection parameters, and send a connection success message to the universal integrated circuit card according to a transmission control protocol connection acknowledgement message received from the far-end over-the-air server, so as to instruct the universal integrated circuit card and the far-end over-the-air server to download data through an established connection;

wherein after the communication processor sends the connection success message to the universal integrated circuit card, the communication processor is configured to receive a data setup request message of the bearer independent protocol from the universal integrated circuit card, convert the data setup request message of the bearer independent protocol to a data setup request message of a transmission control protocol/Internet protocol and send the data setup request message of the transmission control protocol/Internet protocol to the far-end over-the-air server, wherein the data setup request message of the transmission control protocol/Internet protocol is used to request to download data;

wherein after the communication processor sends the data setup request message of the transmission control protocol/Internet protocol to the far-end over-the-air server, the communication processor is configured to receive an establishing data response message of the transmission control protocol/Internet protocol from the far-end over-the-air server, wherein the establishing data response message of the transmission control protocol/Internet protocol carries data downloads; send a channel data available message to the universal integrated circuit card, wherein the channel data available message is used to inform the universal integrated circuit card that the data downloads have been received; and the communication processor is configured to receive a receiving data response message from the universal integrated circuit card and send the data downloads to the universal integrated circuit card.

10. The terminal according to claim 9, wherein in the condition that the connection request message is used to instruct the application processor to establish a connection, the connection response message is a connection success response message, and the connection success response message is used to indicate that the application processor and the far-end over-the-air server have established a connection, the communication processor is further configured to send a connection success message to the universal integrated circuit card so as to indicate the universal integrated circuit card to download data through the connection.

* * * * *